United States Patent
Liu et al.

(10) Patent No.: US 10,027,443 B2
(45) Date of Patent: Jul. 17, 2018

(54) METHOD AND DEVICE FOR FRAME ACKNOWLEDGMENT

(71) Applicant: GUANGDONG NUFRONT COMPUTER SYSTEM CHIP CO., LTD., Guangzhou (CN)

(72) Inventors: Shenfa Liu, Guangzhou (CN); Dongshan Bao, Guangzhou (CN)

(73) Assignee: GUANGDONG NUFRONT COMPUTER SYSTEM CHIP CO., LTD., Guangzhou (CN)

( * ) Notice: Subject to any disclaimer, the term of this patent is extended or adjusted under 35 U.S.C. 154(b) by 197 days.

(21) Appl. No.: 14/910,870

(22) PCT Filed: Aug. 9, 2013

(86) PCT No.: PCT/CN2013/081214
§ 371 (c)(1),
(2) Date: Feb. 8, 2016

(87) PCT Pub. No.: WO2015/018078
PCT Pub. Date: Feb. 12, 2015

(65) Prior Publication Data
US 2016/0197704 A1    Jul. 7, 2016

(51) Int. Cl.
*H04L 1/16* (2006.01)
*H04L 1/18* (2006.01)
*H04W 72/04* (2009.01)

(52) U.S. Cl.
CPC .......... *H04L 1/1621* (2013.01); *H04L 1/1861* (2013.01); *H04W 72/042* (2013.01)

(58) Field of Classification Search
CPC ... H04L 1/1621; H04L 1/1861; H04W 72/042
See application file for complete search history.

(56) References Cited

U.S. PATENT DOCUMENTS

2005/0204247 A1* 9/2005 Guo .............. H04L 1/1854
714/746
2010/0272048 A1* 10/2010 Pan .............. H04L 1/1635
370/329

(Continued)

FOREIGN PATENT DOCUMENTS

| CN | 102684852 A | 9/2012 |
|---|---|---|
| CN | 103037520 A | 4/2013 |
| WO | 2008084927 A1 | 7/2008 |

OTHER PUBLICATIONS

The World Intellectual Property Organization (WIPO) International Search Report for PCT/CN2013/081214 dated May 6, 2014.

*Primary Examiner* — Christine Ng
(74) *Attorney, Agent, or Firm* — Anova Law Group, PLLC

(57) ABSTRACT

The present disclosure is a method for frame acknowledgment. The method includes upon completion of downlink service data scheduling and resource allocation, allocating feedback resources in the uplink of the present physical frame; or, upon completion of the uplink service data scheduling and resource allocation, allocating feedback resources in the downlink of the next frame for sending a Group ACK response. The method further includes according to the allocated feedback resources, encapsulating the corresponding control signaling used for indicating feedback resource allocation; sending the feedback resource control signaling in a control channel of the physical frame. Also disclosed is a device for frame acknowledgement. In a centralized wireless communication system having an uplink and downlink frame structure, the method and device of the present disclosure realize data packet sending and acknowledgment in the form of MAC frames at the MAC level, and achieve the least acknowledgment delay and high reliability by providing group acknowledgment with mini- (Continued)

mum complexity, thus facilitating resource scheduling and retransmission scheduling.

12 Claims, 7 Drawing Sheets

(56) References Cited

U.S. PATENT DOCUMENTS

| | | | | |
|---|---|---|---|---|
| 2011/0128922 A1* | 6/2011 | Chen | .................... | H04L 5/0007 370/329 |
| 2012/0069826 A1* | 3/2012 | Nakao | ................... | H04L 5/0007 370/336 |
| 2014/0274169 A1* | 9/2014 | Ta | ........................ | H04W 12/02 455/458 |

* cited by examiner

| G-MPDU Subframe 1 | G-MPDU Subframe 2 | ... | G-MPDU Subframe n |
|---|---|---|---|
| Byte: Variable | Variable | | Variable |

Figure 3

| G-MPDU Delimiter | MPDU | Fill |
|---|---|---|
| Bytes: 2 | Variable | 0-1 |

Figure 4

METHOD AND DEVICE FOR FRAME ACKNOWLEDGMENT

This application is a national phase entry under 35 U.S.C. § 371 of International Application No. PCT/CN2013/081214, filed on Aug. 9, 2013, the entire content of which is incorporated herein by reference.

FIELD OF THE INVENTION

The present disclosure relates to the field of wireless communications, particularly relates to method for frame acknowledgment and device.

BACKGROUND OF THE INVENTION

IEEE802.11 system is a system based on competition, and the adopted strategy of instant type response ("ACK") is simple and effective. For example, ACK strategy is widely used in IEEE 802.11a/b/g, namely, ACK frame is sent back immediately when a station receives a unicast frame (such as DATA frame). The IEEE 802.11n systems have employed HT (High Throughput) Block ACK mechanism to acknowledge batches of data packets, which improves system efficiency. Especially, the block ACK strategy of HT immediate-type is a high-efficiency Block ACK mechanism among HT stations, namely, when a HT station have sent one batch of aggregate frames and its ACK policy position carried is set as normal ACK, by default the system adopts the immediate-type ACK policy. In addition, IEEE 802.11n also the defines delaying-type ACK strategy, if a system adopts the delaying-type ACK, the time delay of packet transmission can increase, which may be adverse to transmitting latency sensitive operations.

Among the existing communication systems based on centralized scheduling, such as, in IEEE 802.16 and long-term evolution (Long Term Evolution is called for short LTE) systems, all have employed the hybrid automatic repeat-request (HARQ-ACK) mechanism. HARQ mechanism acknowledges based on Physical Resource Block. Thus, timeliness and validity may be guaranteed. However, this unavoidably increases the complexity of implementation, and compared with other ACK mechanism of the MAC level of IEEE 802.11 systems, its reliability may also be greatly reduced.

Downlink HARQ mechanism of LTE system is briefly described as follows. The Downlink channel of the system comprises control signals, reference signals, and data signals. Wherein, Downlink data signals transmitted in Physical Downlink Shared Channel (PDSCH), and Packet Data Control Channel (PDCCH) transmits data transmission scheduling results. Uplink signal also comprises control signals and data signals. Physical Uplink Shared Channel (PUSCH) can be used for transmitting uplink control signals, including ACK/NACK, CQI indication signals etc. HARQ-ACK mechanism in LTE system acknowledges based on physical sub-frames, and the RLC layer of the LTE system needs comparatively complicated segmentation and recombination to adapt to Transmission Block (TB) of the physical layer.

In IEEE 802.16 systems also uses H-ARQ strategy. It is necessary to apply comparatively complicated segmentation method to form HARQ sub-packets. H-ARQ acknowledges based on HARQ sub-packets. In a word, HARQ causes the relatively low reliability of system and high implementation complexity, with increased effectiveness. The MAC layer of 802.16 systems have employed optional ARQ strategies, but owing to the need to dispatch ACK as an uplink data frame, the acknowledgement efficiency may be low with relatively long delays. Such systems, however, may be less complex to implement.

The ARQ function of the MAC layer of 802.16 systems is optional, and the scheduling of ACK is not instant, which causes long delays and complex implementations. Meanwhile, the ARQ requires acknowledgment of the ARQ-BLOCK, and ARQ-BLOCK sub-packet needs to be segmented, which may cause the efficiency of frame acknowledgment to be lower.

SUMMARY OF THE INVENTION

In view of the above, the purpose of the present disclosure is to provide a method and apparatus for frame acknowledgment. A brief summary is given below to provide a basic understanding of some aspects of the embodiments disclosed. This section of summary is not to provide a general commentary, or to determine the key/important elements or to describe the protection scopes of these embodiments, but is merely to simply present some concepts, which act as a preamble of the subsequent detailed illustration.

One aspect of this present disclosure is to provide a method for frame acknowledgment. The method includes allocating feedback resources in current physical frame after scheduling of downlink service data and resource allocation being completed; or, allocating feedback resources in downlink of next frame after the scheduling of uplink service data and resource allocation completed, wherein the allocating is for sending a group acknowledgement response Group ACK.

The method further includes encapsulating corresponding feedback resources control signaling according to the allocated feedback resources, wherein the feedback resources control signaling is used for indicating allocation of feedback resources; and sending the feedback resources control signaling in control channel of the physical frame.

Optionally, said feedback resource is a transmission channel resource or a short signaling channel resource.

Optionally, the method further includes allocating corresponding uplink transmission channel resources or uplink short signaling channel resources in uplink of an Nth frame for a user scheduled in downlink of the Nth frame after the scheduling of downlink service data and resource allocation of the Nth frame being completed, wherein the allocating is for sending a MAC layer group acknowledgement response Group ACK; encapsulating corresponding feedback resources control signaling according to the allocated uplink transmission channel resources or uplink short signaling channel resources; and sending this feedback resources control signaling in control channel of the Nth frame.

Optionally, a user scheduled in downlink demodulates on control channel in the Nth frame, obtains corresponding downlink transmission resource indication signaling information and feedback resource control signaling information; said feedback resource being an uplink transmission channel resource or an uplink short signaling channel resource.

Optionally, the method includes after the user receives the one or more MAC groups MPDU in corresponding downlink transmission resource, generating acknowledgement response of one or more MPDUs, and encapsulating the acknowledgement response of one or more MPDUs as MAC layer group acknowledgement response Group ACKs, and send to a CAP in the uplink transmission channel or uplink short signaling channel of the Nth frame.

Optionally, the method further includes allocating corresponding downlink transmission channel resources or downlink short signaling channel resources in downlink of the (N+1)th frame for the user scheduled in uplink of the Nth frame after the scheduling of uplink service data and resource allocation of the Nth frame completed, wherein the allocating is used for sending MAC layer group acknowledgement response Group ACK; encapsulating corresponding feedback resources control signaling according to the allocated downlink transmission channel resources or downlink short signaling channel resources; and sending this feedback resources control signaling in control channel of the (N+1)th frame.

Optionally, the user scheduled in uplink carry out demodulation on control channel in the Nth frame, obtains corresponding uplink transmission resource indication signaling information, carries out demodulation on control channel in the (N+1)th frame, and obtains corresponding feedback resource control signaling information; said feedback resource being a downlink transmission channel resource or a downlink short signaling channel resource.

Optionally, after receiving the one or more MAC groups MPDU in corresponding downlink transmission resource, the CAP generates acknowledgement response of one or more MPDUs, and encapsulates the acknowledgement response of one or more MPDUs as MAC layer group acknowledgement response Group ACK, and sends in downlink transmission channel or downlink short signaling channel of the (N+1)th frame.

Optionally, said control channel is used for indicating the feedback resource allocation of the corresponding downlink transmission channel or downlink short signaling channel of the frame to a user scheduled in uplink of previous frame; for a CAP to send group acknowledgement response Group ACK; and, for indicating the feedback resource allocation of the link transmission channel or uplink short signaling channel to a user scheduled in downlink of this frame, the allocation information being used for STA to send a Group ACK.

Another aspect of the present disclosure provides an apparatus for frame acknowledgment. The apparatus includes an allocation module, configured to allocate feedback resources in current physical frame after the scheduling of downlink service data and resource allocation completed; or, allocate feedback resources in downlink of next frame after the scheduling of uplink service data and resource allocation completed, the allocating being used for sending group acknowledgement response Group ACK; an encapsulation module, configured to encapsulate corresponding feedback resources control signaling according to the allocated feedback resources, said feedback resources control signaling is used for indicating allocation of feedback resources; and a sending module, being used for sending said feedback resources control signaling in control channel of a physical frame.

Optionally, said feedback resource is a transmission channel resource or a short signaling channel resource.

Optionally, said allocation module is further configured for CAP allocating corresponding uplink transmission channel resources or uplink short signaling channel resources in uplink of the Nth frame for the user scheduled in downlink of the Nth frame after the scheduling of downlink service data and resource allocation of the Nth frame completed, used for sending MAC layer group acknowledgement response Group ACK; said encapsulation module is further configured for encapsulating corresponding feedback resources control signaling according to the allocated uplink transmission channel resources or uplink short signaling channel resources; and said sending module is further configured for sending this feedback resources control signaling in control channel of the Nth frame.

Optionally, said allocation module is further configured for CAP allocate corresponding downlink feedback resources or downlink short signaling in downlink of the (N+1)th frame for the user scheduled in uplink of the Nth frame after the scheduling of downlink service data and resource allocation of the Nth frame completed, used for sending group acknowledgement response Group ACK; said encapsulation module is further configured for encapsulating corresponding feedback resources control signaling according to the allocated downlink transmission channel resources or downlink short signaling channel resources; said sending module is further configured for sending this feedback resources control signaling in control channel of the (N+1)th frame.

Optionally, a generation module, configured to generate acknowledgement response of one or more MPDU after receiving group in corresponding uplink transmission resource, and encapsulating said acknowledgement response of one or more MPDU as MAC layer group acknowledgement response Group ACK; a second sending module, configured to send this Group ACK in the downlink transmission channel or the downlink short signaling channel of the (N+1)th frame.

Optionally, said control channel is configured for indicating feedback resource allocation of the corresponding downlink transmission channel or downlink short signaling channel of this frame to user scheduled in uplink of previous frame; for CAP to send group acknowledgement response Group ACK; and for indicating feedback resource allocation of uplink transmission channel or uplink short signaling channel to user scheduled in downlink of this frame, used for STA to send Group ACK.

Another aspect of the present disclosure provides an apparatus for frame acknowledgment. The apparatus includes a receiving module, used for receiving downlink physical frame; a demodulation module, used for carrying out demodulation on control channel of physical frame, obtains corresponding downlink transmission resource indication signaling information and feedback resource control signaling information.

Optionally, said feedback resource is an uplink transmission channel resource or an uplink short signaling channel resource.

Optionally, the apparatus further includes a generation module, configured to generate acknowledgement response of one or more MPDUs after receiving one or more groups in corresponding downlink transmission resource, and encapsulate acknowledgement response of the said one or more MPDUs as MAC layer group acknowledgement response Group ACK; and a sending module, configured to send this Group ACK in uplink transmission channel or uplink short signaling channel of current frame.

Optionally, the apparatus further includes a receiving module, configured to receive downlink physical frame; a demodulation module, configured to carry out demodulation on control channel of physical frame, obtain corresponding uplink transmission resource indication signaling information, carry out demodulation on control channel of next frame, and obtain corresponding feedback resource control signaling information.

Optionally, said feedback resource is a downlink transmission channel resource or a downlink short signaling channel resource.

Adopt the method or apparatus of the present disclosure may have the following effects.

1. Realize carry out transmission and acknowledgement of data packet with form of MAC frame at MAC layer, and this packet acknowledge taking minimum complexity as cost, it is achieved that minimum acknowledgement time delay and very high reliability.

2. Group aggregation frame G-MPDU seldom comprise fragment, to reduce use of fragment.

3. Implementing transmission of ACK Source scheduling mode, configuration uplink and downlink channel, considers from time sequence, short signaling channel is arranged in the front, Scheduling are transmit in signaling feedback channel so as to receive ACK at sending receiving time, time delay is little, and reaction is fast, it is conducive to resource scheduling and retransmitting scheduling;

4. Aggregation G-ACK.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

BRIEF DESCRIPTION OF THE DRAWING

FIG. 3 shows structure diagram of G-MPDU.

FIG. 4 shows structure diagram of G-MPDU.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part of and a certain feature of some embodiments may be included in or replaced by a part of and a certain feature of other embodiment. The scope of the embodiment of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended certainly to limit the application scope to any individual invention or inventive concept.

Figure 1:
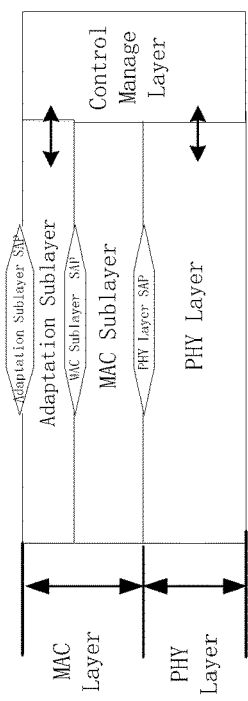
FIG. 1 shows the PHY layer frame structure of the newly defined short-distance and medium-distance wireless communication system.
Figure 2:
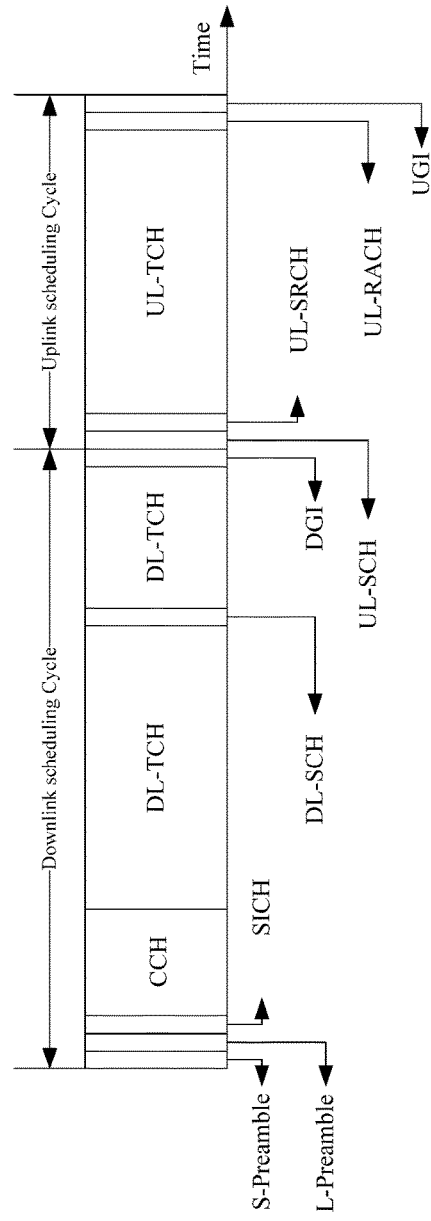
FIG. 2 is another kind of frame structure diagram provided in embodiment of this present disclosure.

The embodiment of the present disclosure is based on a type of wireless communication systems. This system possesses the following features. A frame cycle is divided into uplink and downlink frame cycle in Physical Frame Structure. The uplink/downlink frames cycle includes data transmission channel and signaling channel. This wireless communication system needs centralized scheduling. The resource in the downlink frame cycle and uplink frame cycle needs concentrating scheduling by CAP. See FIG. 1. The figure shows the PHY layer frame structure of the newly defined short-distance and medium-distance wireless communication system. The frame structure is as shown in FIG. 2. In the frame structure, the definition of each sub-channel is as shown in table 1.

TABLE 1

| Channel Name | Function |
| --- | --- |
| Short-Preamble Sequence | System rough synchronization |
| Long-Preamble Sequence | System fine synchronization and channel estimation |
| System Information Channel (SICH) | 1. Broadcast frame structural configuration |
| Transmission Control Channel (CCH) | 1. Resource scheduling uplink transmission channel<br>2. Resource scheduling downlink transmission channel |
| Downlink Sounding Channel (DL-SCH) | 1. Downlink channel measurement |
| Uplink Sounding Channel (UL-SCH) | 1. Uplink channel measurement |
| Uplink Scheduling Request Channel (UL-SRCH) | 1. Uplink scheduling request |
| Uplink Random Access Channel (UL-RACH) | 1. STA initial access |
| Downlink Transmission Control Channel (DL-TCH) | 1. Downlink service transmission<br>2. Downlink short signaling transmission |
| Uplink Transmission Control Channel (UL-TCH) | 1. Uplink service transmission<br>2. Uplink short signaling transmission |
| Downlink Guard Interval (DGI) | 1. Downlink to uplink Tx/Rx guard interval |
| Uplink Guard Interval (UGI) | 1. Downlink to uplink Tx/Rx guard interval |

The MAC PDU in this system needs not carry out complicated segmenting or dividing, and the formed G-MPDU can be directly sent in DL-TCH and UL-TCH of the Physical Frame Structure, as shown in FIG. 3 and FIG. 4.

Below is an explanation. ACK is usually scheduled in DL-TCH and UL-TCH and transmitted or be scheduled in the short signaling channel in front of transmission channel. When ACK is transmitted in transmission channel time, it is possible to form a G-MPDU together with general data frame. Above-mentioned G-MPDU is an example of a data frame.

Embodiments of the present disclosure provides, in a centralized scheduling wireless communication system with an uplink and downlink structure, a type of MAC level and immediate-type ACK strategy. Embodiments of the present disclosure thus realizes acknowledgement with shorter delay and high reliability, and with minimum complexity. The method of frame acknowledgment consistent with the embodiment of the present disclosure apply to both management frames and data frames. After the transmitting terminal sends a transmission frame, the receiving terminal immediately sends an acknowledgment response to inform whether data sent by the transmitting terminal are successfully received. As such, embodiments of the present disclosure may monitor whether data are sent successfully or not and carries out effective monitoring.

In some embodiments of the present disclosure, a central access point (CAP) is an entity of the STA offer access services for accessed STA. STA has an media access control (MAC) and physical layer (PHY) function interface. The terminal device that can communicate with CAP. Communications between CAP and STA is carried out by physical frames. Each physical frame period includes a downlink cycle and uplink cycle. A CAP sends data to a STA during a downlink cycle. A STA sends data to a CAP during an uplink cycle.

In the wireless communication system consistent with the present disclosure, the CAP completes distribution and scheduling functions of system resource. The scheduling results are broadcasted to users by Resource Distribute control signaling CCH.

The downlink scheduling by the CAP mainly completes resource distribution in the downlink frame cycle, which may include the resource distribution of DL-TCH services and generation of CCH control signaling.

The uplink scheduling mainly completes resource distribution in the uplink frame cycle, which may include resource distribution of UL-TCH service and generation of CCH control signals.

The instant type ACK method proposed in embodiments of present disclosure is realized by the scheduling of system and generate the corresponding CCH control signaling. The uplink and downlink scheduling result information of the Nth frame would be prepared in advance, before the Nth physical frame is sent.

Embodiment One

Figure 5:
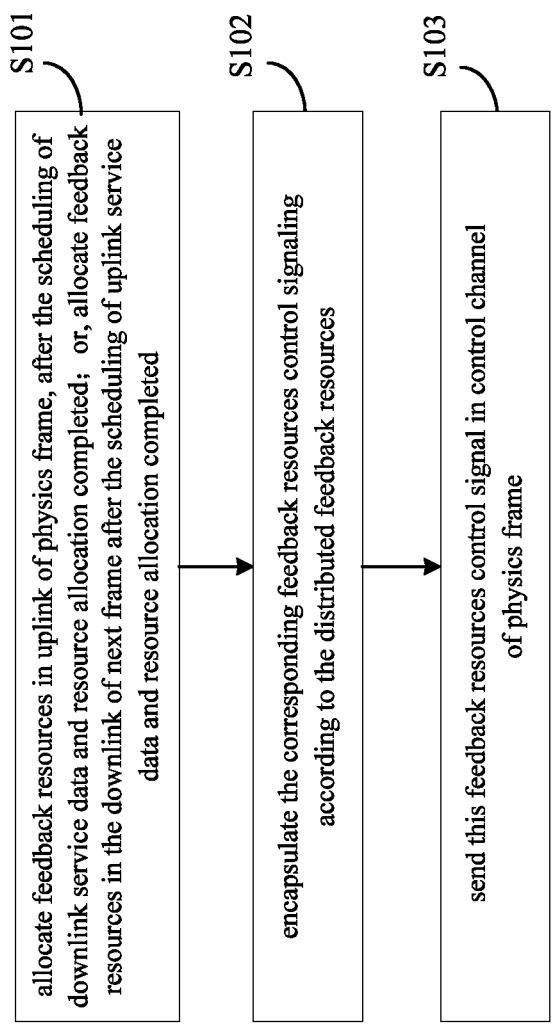
FIG. 5 is a flow diagram of method for frame acknowledgment provided in the first embodiment of this present disclosure.

One embodiment of the present disclosure proposes a method for frame acknowledgment, as shown in FIG. 5. The method includes the following steps.

Step S101: Allocate feedback resources in uplink of physical frame, after the scheduling of downlink service data and resource allocation is completed. Allocate feedback resources in the downlink of next frame after the scheduling of uplink service data and resource allocation is completed, which is used for sending group acknowledgement response Group ACK.

Step S102: Encapsulate the corresponding feedback resources control signal according to the distributed feedback resources. This feedback resources control signal is used for indicating allocation of feedback resources.

Step S103: Sends the feedback resources control signaling in control channel of the physical frame.

Optionally, feedback resources may be transmission channel resources, or, short signaling channel resource.

Optionally, for the user who is scheduled on uplink of the previous frame, this control channel can indicate the downlink transmission channel of this frame or the feedback resource allocation of the downlink short signal channel. This may be used for the CAP to send the group acknowledgement response Group ACK. This may also indicate, for the user scheduled on downlink of the current frame, the uplink transmission channel of this frame or the feedback resource allocation of uplink short signaling channel. This may be used for the STA to send group acknowledgement response Group ACK.

Optionally, after the scheduling of downlink service data and resource allocation is completed, the system may also encapsulate downlink transmission resource indication signaling in the CAP, which may be used for sending service data. The data are sent to the STA through the control channel of the physical frame.

Optionally, what the control channel of this physical frame indicated is the resource allocation conditions of the uplink/downlink of this physical frame, the details of which are further described below.

When the feedback resources are allocated in the uplink of this physical frame, then accordingly, sends this feedback resources control signaling in the control channel of this physical frame.

When the feedback resources are allocated in the downlink of the previous physical frame, then accordingly, sends this feedback resources control signaling in the control channel of the next frame.

Embodiment Two

Figure 6:
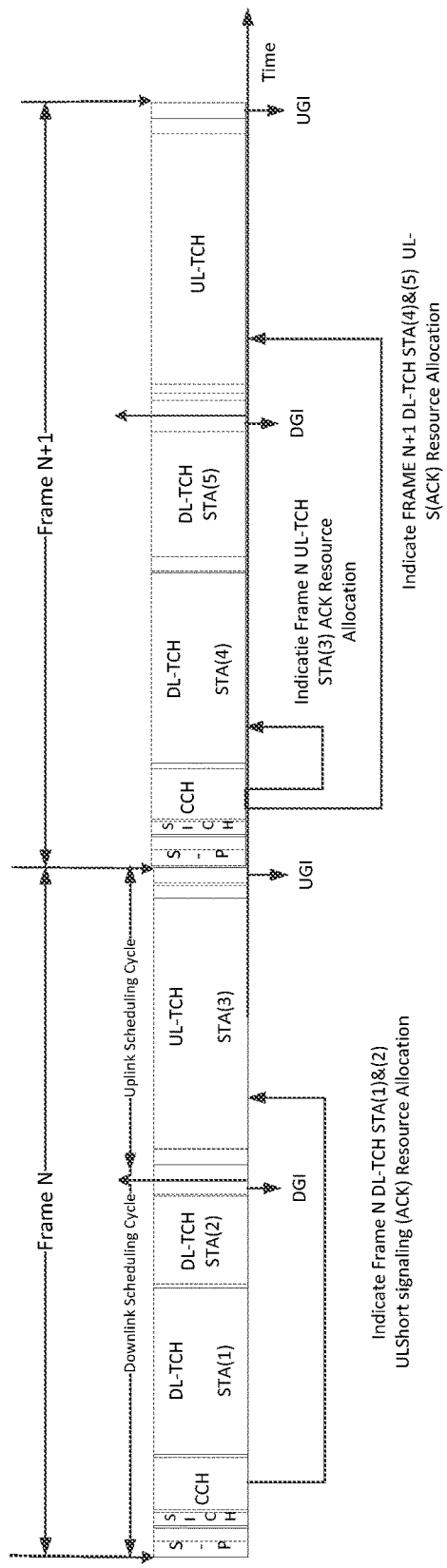
FIG. 6 is a system frame structure diagram of uplink and downlink scheduling transmission process provided in the second, third and fourth embodiment of this present disclosure.

The embodiment two of the present disclosure proposes a type of method for frame acknowledgment. The uplink and downlink scheduling transmission process disclosed in embodiment two is performed based on a system frame structure as shown in FIG. 6. The method includes the following steps.

Step S201: after the scheduling of downlink service data and resource allocation is completed, the CAP allocates corresponding uplink feedback resources in uplink transmission channel of the Nth frame for the user scheduled in the downlink of the Nth frame, which may be used for sending group MAC layer acknowledgement response Group ACK.

Step S202: according to the allocated feedback resources, the CAP encapsulates corresponding feedback resources control signaling. This feedback resources control signal is used for indicating allocation of feedback resources.

Optionally, after scheduling of downlink service data and resource allocation is completed, the system also encapsulates downlink transmission resource indication signal in the CAP, which may be used for sending downlink service data.

Step S203: the CAP sends the feedback resources control signal in control channel of the Nth frame, this feedback resources control signaling is used for uplink transmission channel resources control.

Optionally, CAP also sends downlink transmission resource indication signaling in the control channel of the Nth frame.

Optionally, the method further includes the following steps.

Step S204: the user STA being scheduled in downlink may demodulate the control channel of the Nth frame to obtain the corresponding downlink transmission resource indication signal information and uplink transmission channel resource control signal information.

Optionally, the method may include the following steps.

Step S205: after the user STA being scheduled in downlink receives the one or more MAC groups MPDUs in the corresponding downlink transmission resource, the system may generate the acknowledgement response for one or more MPDUs, and encapsulate the said acknowledgement response for the one or more MPDUs as the MAC layer group acknowledgement response Group ACK. The system may send the Group ACT to the CAP in the uplink transmission channel of the Nth frame.

Optionally, this control channel can be used for indicating the feedback resource allocation of the corresponding downlink transmission channel of this frame to user scheduled in uplink of previous frame, used for CAP to send group acknowledgement response Group ACK; And/or, indicate the feedback resource allocation of the uplink transmission channel to user scheduled in downlink of this frame, used for STA to send group acknowledgement response Group ACK.

Embodiment Three

The embodiment three of the present disclosure proposes a kind of method for frame acknowledgment. The uplink and downlink scheduling transmission process disclosed in embodiment three is performed based on a system frame structure as shown in FIG. 6. The method includes the following steps.

Step S301: after the scheduling of uplink service data and resource allocation of the Nth frame is completed, the CAP allocates corresponding uplink feedback resources in uplink transmission channel of the Nth frame for the user scheduled in downlink of the (N+1)th frame, which is used for sending group acknowledgement response Group ACK.

Step S302: according to the allocated downlink transmission channel resources, CAP encapsulate corresponding feedback resources control signaling, this feedback resources control signaling is used for indicating allocation of feedback resources.

Optionally, after scheduling of uplink service data and resource allocation completed, the system also encapsulates uplink transmission resource indication signaling in CAP, which is used for sending uplink service data.

Step S303: the CAP sends this feedback resources control signaling in control channel of the (N+1)th frame, this feedback resources control signaling is used for downlink transmission channel resources control signal.

Optionally, the CAP also sends uplink transmission resource indication signal in the control channel of (N+1)th frame.

Optionally, the method includes the following steps.

Step S304: user, the STA being scheduled in uplink carry out demodulation on Control channel in the Nth frame, obtains corresponding uplink transmission resource indication signaling information and send service data to CAP; carry out demodulation on Control channel in the (N+1)th frame, obtains corresponding downlink transmission channel resource control signaling information.

Optionally, the method also includes the following steps.

Step S305: after the CPA received the one or more MAC groups MPDU in corresponding uplink transmission resource, generate the acknowledgement response of one or more MPDU, and encapsulate the said acknowledgement response of one or more MPDU as MAC layer group acknowledgement response Group ACK, and send in the downlink transmission channel of the (N+1)th frame.

Optionally, this control channel can be used for indicating the feedback resource allocation of the corresponding downlink transmission channel of this frame to user scheduled in uplink of previous frame, used for CAP to send group acknowledgement response Group ACK; And/or, indicate the feedback resource allocation of the uplink transmission channel to user scheduled in downlink of this frame, used for STA to send Group ACK.

Embodiment Four

The embodiment four of the present disclosure proposes a kind of method for frame acknowledgment. The uplink and downlink scheduling transmission process disclosed in embodiment four is performed based on a system frame structure as shown in FIG. 6. The method includes the following steps.

Step S401: after the scheduling of downlink service data and resource allocation of the Nth frame is completed, the CAP allocates corresponding uplink feedback resources in uplink transmission channel of the Nth frame for the user scheduled in downlink of the Nth frame, which is used for sending MAC layer group acknowledgement response Group ACK.

Step S402: according to the allocated uplink transmission channel resources, the CAP encapsulates corresponding feedback resources control channel signaling. This feedback resources control signaling is used for indicating allocation of feedback resources.

Optionally, after scheduling of downlink service data and resource allocation is completed, the system also encapsulates downlink transmission resource indication signal in the CAP, used for sending downlink service data.

Step S403: the CAP sends this feedback resources control signaling in control channel of the Nth frame. This feedback resources control signaling is uplink short signaling channel resources control signaling.

Optionally, the CAP also sends downlink transmission resource indication signaling in the control channel of the Nth frame.

Optionally, the method includes the following steps.

Step S404: the user STA being scheduled in uplink carry out demodulation on control channel in the Nth frame to obtain corresponding downlink transmission resource indication signal information and uplink transmission channel resource control signaling information.

Optionally, the method includes the following steps.

Step S405: after the user STA being scheduled in uplink received the one or more MAC groups MPDU in the corresponding uplink transmission resource, generate the acknowledgement response of one or more MPDU, and encapsulate the acknowledgement response of one or more MPDU as MAC layer group acknowledgement response Group ACK, and send to CAP in the uplink transmission channel of the Nth frame.

Step S406: after the scheduling of uplink service data and resource allocation of the Nth frame is completed, the CAP allocates corresponding downlink transmission channel resources in downlink of the (N+1)th frame, for the user scheduled in uplink of the Nth frame, which is used for sending group acknowledgement response Group ACK.

Step S407: according to the allocated downlink transmission channel resources, the CAP encapsulates corresponding feedback resources control signaling.

Optionally, after scheduling of uplink service data and resource allocation completed, also encapsulate uplink transmission resource indication signaling in CAP, used for sending uplink service data.

Step S408: CAP sends this feedback resources control signaling in control channel of the (N+1)th frame, this feedback resources control signaling is short signaling channel resources control signaling.

Optionally, CAP also sends uplink transmission resource indication signaling in the control channel of the (N+1)th frame.

Optionally the method includes the following steps.

Step S409: user, the STA being scheduled in uplink carry out demodulation on Control channel in the Nth frame, obtains corresponding uplink transmission resource indication signaling information and send service data to CAP; carry out demodulation on Control channel in the (N+1)th frame, obtains corresponding downlink transmission channel resource control signaling information.

Optionally the method includes the following steps.

Step S410: after the CPA received the one or more MAC groups MPDU in corresponding uplink transmission resource in the Nth frame, generate the acknowledgement response of one or more MPDU, and encapsulate the said acknowledgement response of one or more MPDU as MAC layer group acknowledgement response Group ACK, and send in the downlink transmission channel of the (N+1)th frame.

Optionally, this control channel can be used for indicating the feedback resource allocation of the corresponding downlink transmission channel of this frame to user scheduled in uplink of previous frame, used for CAP to send group acknowledgement response Group ACK; And/or, indicate the feedback resource allocation of the uplink transmission channel to user scheduled in downlink of this frame, used for STA to send Group ACK.

Embodiment Five

Figure 7:
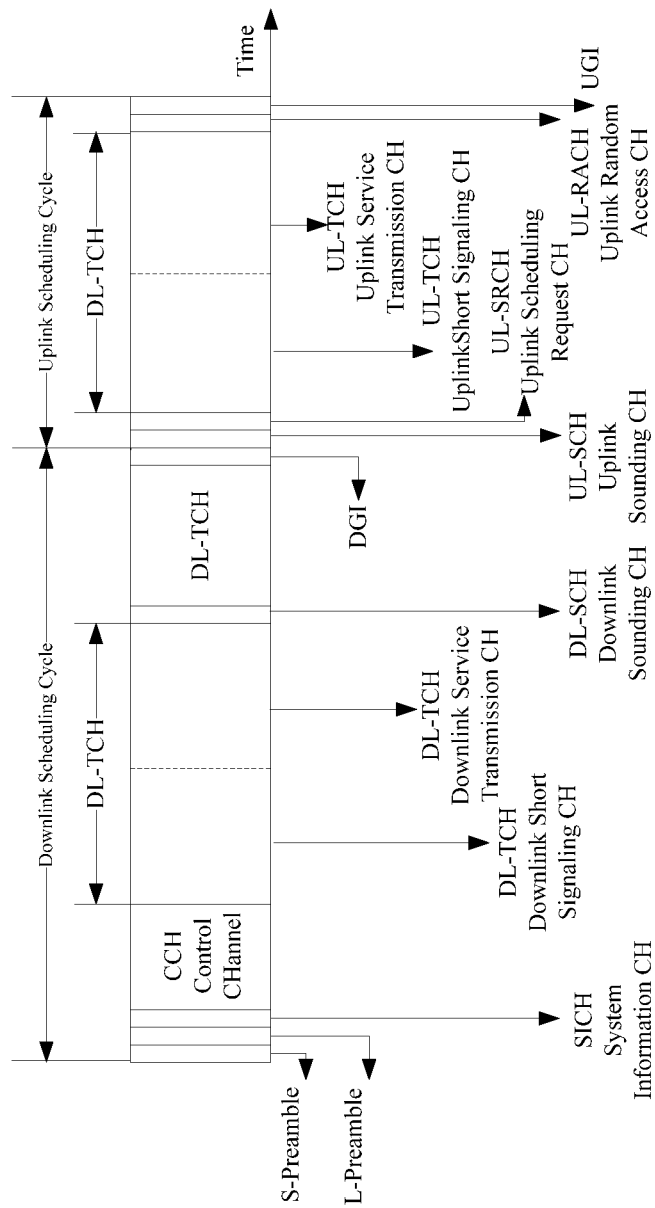
FIG. 7 is another frame structure diagram provided in the fifth embodiment of this present disclosure.

As shown in FIG. 7, the DL-TCH downlink transmission channel in the frame structure of FIG. 2 is specifically divided into two parts: head part: DL-TCH downlink short signaling channel, and rear section: DL-TCH downlink transmission channel. UL-TCH uplink transmission channel is specifically divided into two parts: head part: UL-TCH uplink short signaling channel, and rear section: UL-TCH downlink transmission channel. DL-TCH downlink short signaling channel and UL-TCH uplink short signaling channel are for sending ACK; DL-TCH downlink transmission channel and UL-TCH uplink transmission channel are for sending service data.

Embodiment Six

Figures 8, 9:
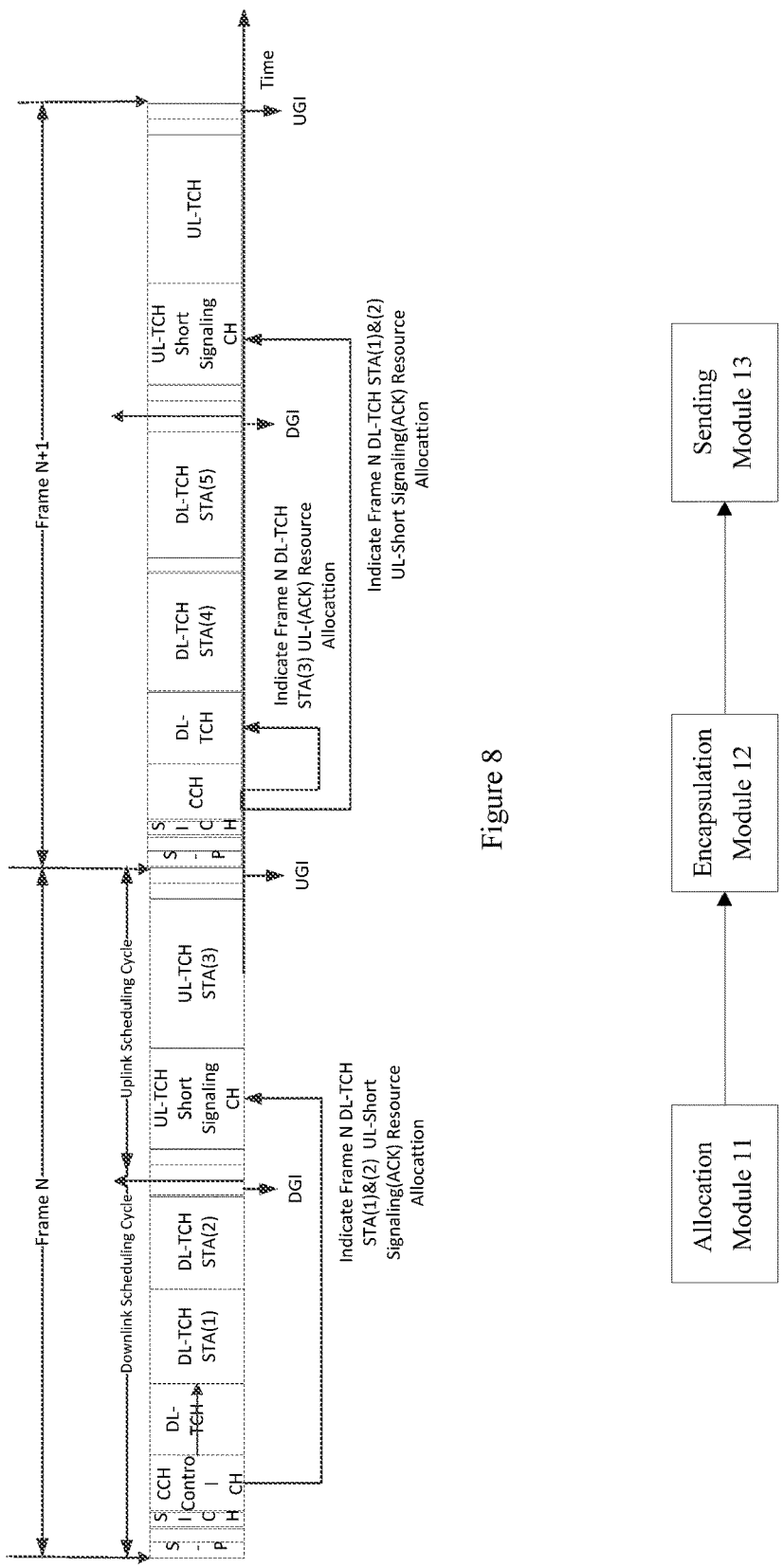
FIG. 8 is a system frame structure diagram of uplink and downlink scheduling transmission process provided in the 6th-9th embodiment of this present disclosure.
FIG. 9 is a diagram of apparatus for frame acknowledgment provided in the 10th embodiment of this present disclosure.

The embodiment six of the present disclosure proposes a method for frame acknowledgment. The uplink and downlink scheduling transmission process disclosed in embodiment six is performed based on a system frame structure as shown in FIG. 8. The method includes the following steps.

Step S501: after the scheduling of downlink service data and resource allocation of the Nth frame is completed, the CAP allocates corresponding uplink feedback resources in uplink transmission channel of the Nth frame for the user scheduled in downlink of the Nth frame, used for sending MAC layer group acknowledgement response Group ACK.

Step S502: according to the allocated uplink transmission channel resources, the CAP encapsulates corresponding feedback resources control signaling, this feedback resources control signaling is used for indicating allocation of feedback resources.

Optionally, after scheduling of downlink service data and resource allocation is completed, the CAP also encapsulates downlink transmission resource indication signaling, used for sending downlink service data.

Step S503: the CAP sends this feedback resources control signaling in control channel of the Nth frame, this feedback resources control signaling is uplink short signaling channel resources control signaling.

Optionally, the CAP also sends downlink transmission resource indication signaling in the control channel of the Nth frame.

Optionally, the method includes the following steps.

Step S504: the user STA being scheduled in downlink carries out demodulation on Control channel in the Nth frame, and obtains corresponding downlink transmission resource indication signaling information and uplink short signaling channel resource control signaling information.

Optionally, the method includes the following steps.

Step S505: after the user STA being scheduled in downlink receives the one or more MAC groups MPDU in corresponding uplink transmission resource, generate the acknowledgement response of one or more MPDUs, and encapsulate the acknowledgement response of one or more MPDUs as MAC layer group acknowledgement response Group ACK.

Optionally, this control channel can be used for indicating the feedback resource allocation of the corresponding downlink short signaling channel of this frame to user scheduled in uplink of previous frame, which is used for the CAP to send group acknowledgement response Group ACK. Or, control channel can be used for indicating the feedback resource allocation of the uplink short signaling channel to user scheduled in downlink of this frame, used for STA to send Group ACK.

Embodiment Seven

Embodiment seven of the present disclosure proposes a method for frame acknowledgment. The uplink and downlink scheduling transmission process disclosed in embodiment seven is performed based on a system frame structure as shown in FIG. 8. The method includes the following steps.

Step S601: after the scheduling of downlink service data and resource allocation of the Nth frame is completed, the CAP allocates corresponding downlink short signaling channel resources in downlink of the (N+1)th frame for the user scheduled in downlink of the Nth frame, which is used for sending acknowledgement response ACK.

Step S602: according to the allocated downlink short signaling channel resources, CAP encapsulate corresponding feedback resources control signaling, this feedback resources control signaling is used for indicating allocation of feedback resources.

Optionally, after scheduling of uplink service data and resource allocation completed, also encapsulate uplink transmission resource indication signaling in CAP, which is used for sending uplink service data.

Step S603: the CAP sends this feedback resources control signaling in control channel of the (N+1)th frame, this feedback resources control signaling is link transmission channel resources control signaling.

Optionally, the CAP also sends uplink transmission resource indication signaling in the control channel of the (N+1)th frame.

Optionally, the method includes the following steps.

Step S604: the user being scheduled in uplink carry out demodulation on Control channel in the Nth frame, obtains corresponding uplink transmission resource indication signaling information and send service data to CAP; carries out demodulation on control channel in the (N+1)th frame, and obtains corresponding downlink transmission channel resource control signaling information.

Optionally, the method includes the following steps.

Step S605: after the CPA receives the one or more MAC groups MPDUs in corresponding uplink transmission resource, generate the acknowledgement response of one or more MPDUs, and encapsulates the said acknowledgement response of one or more MPDUs as MAC layer group acknowledgement response Group ACK, and sends in the downlink short signaling channel of the (N+1)th frame.

Optionally, this control channel can be used for indicating the feedback resource allocation of the corresponding downlink short signaling channel of this frame to user scheduled in uplink of previous frame, which is used for CAP to send group acknowledgement response Group ACK. This control channel can be used for indicating the feedback resource allocation of the uplink short signaling channel to user scheduled in downlink of this frame, which is used for STA to send Group ACK.

Embodiment Eight

The embodiment eight of the present disclosure proposes a kind of method for frame acknowledgment. The uplink and downlink scheduling transmission process disclosed in embodiment seven is performed based on a system frame structure as shown in FIG. 8. The method includes the following steps.

Step S701: after the scheduling of downlink service data and resource allocation of the Nth frame is completed, the CAP allocates corresponding uplink short signaling channel resources in uplink channel of the Nth frame for the user scheduled in downlink of the Nth frame, used for sending group acknowledgement response Group ACK.

Step S702: according to the allocated uplink short signaling channel resources, the CAP encapsulates corresponding feedback resources control channel signaling. This feedback resources control signaling is used for indicating allocation of feedback resources.

Step S703: the CAP sends this feedback resources control signaling in control channel of the Nth frame. This feedback resources control signaling is uplink short signaling channel resources control signaling.

Optionally, the CAP also sends downlink transmission resource indication signaling in the control channel of the Nth frame.

Optionally, the method includes the following steps.

Step S704: the user, STA, being scheduled in downlink carries out demodulation on control channel in the Nth frame, and obtains corresponding downlink transmission resource indication signaling information and uplink short signaling channel resource control signaling information.

Optionally, the method includes the following steps.

Step S705: after the user, STA, which is scheduled in downlink received the one or more MAC groups MPDUs in corresponding downlink transmission resource, generates the acknowledgement response of one or more MPDUs, encapsulates the acknowledgement response of one or more MPDUs as MAC layer group acknowledgement response Group ACK, and sends to the CAP in the uplink short signaling channel of the Nth frame.

Step S706: after the scheduling of uplink service data and resource allocation of the Nth frame is completed, the CAP allocates corresponding downlink short signaling channel resources in downlink of the (N+1)th frame, for the user scheduled in uplink of the Nth frame, which is used for sending group acknowledgement response Group ACK.

Step S707: according to the allocated downlink short signaling channel resources, the CAP encapsulates corresponding feedback resources control signaling.

Step S708: the CAP sends this feedback resources control signaling in control channel of the (N+1)th frame. This feedback resources control signaling is short signaling channel resources control signaling.

Optionally, the CAP also sends uplink transmission resource indication signaling in the control channel of the (N+1)th frame.

Optionally, the method includes the following steps.

Step S709: the user, the STA being scheduled in uplink carry out demodulation on Control channel in the Nth frame, obtains corresponding uplink transmission resource indication signaling information and send service data to CAP; carries out demodulation on Control channel in the (N+1)th frame, and obtains corresponding downlink short signaling channel resource control signaling information.

Optionally, the method includes the following steps.

Step S710: after the CPA receives the one or more MAC groups MPDUs in corresponding uplink transmission resource in the Nth frame, generates the acknowledgement response of one or more MPDU, and encapsulate the said acknowledgement response of one or more MPDU as MAC layer group acknowledgement response Group ACK, and sends in the downlink short signaling channel of the (N+1)th frame.

Optionally, this control channel can be used for indicating the feedback resource allocation of the corresponding downlink short signaling channel of this frame to user scheduled in uplink of previous frame, used for CAP to send group acknowledgement response Group ACK. This control channel can also be used for indicating the feedback resource allocation of the uplink short signaling channel to user scheduled in downlink of this frame, used for STA to send Group ACK.

Embodiment Nine

The embodiment nine of the present disclosure is a specific application example.

FIG. 8 shows a diagram of the system frame structure of scheduling transmission process provided in an embodiment.

As shown in FIG. 8, preamble sequence, system information channel, control channel, downlink short signaling channel, downlink service transmission channel, downlink guard interval DGI, uplink sounding channel, uplink scheduling request channel, uplink short signaling channel, uplink service transmission channel, uplink random access channel, and uplink guard interval UGI.

The preamble sequences include a short preamble sequence and a long preamble sequence.

A CAP is associated with three STAs: STA1, STA2, and STA3. The downlink general instant ACK strategy, which is implemented based on the system frame structure as shown in FIG. 8, includes steps as follows.

Step S801: after the scheduling of downlink service data and resource allocation of the Nth frame is completed, the CAP allocates corresponding feedback resources in uplink of the Nth frame for the user scheduled in downlink of the Nth frame, used for sending group acknowledgement response Group ACK. As shown in FIG. 8, allocate corresponding uplink short signaling channel resources in uplink of the Nth frame for STA1 and STA2 in CCH of the Nth frame, used for sending Group ACK.

Step S802: the CAP generates corresponding CCH signaling for aforementioned ACK, and sends in the CCH control channel of the Nth frame.

Step S803: STA1 and STA2 carry out demodulation on control channel CCH, obtains corresponding downlink TCH resource and uplink ACK feedback resource. After the STA1 and STA2 receives the one or more MAC groups MPDUs in corresponding downlink transmission resource, generates the acknowledgement response of one or more MPDU, and encapsulates the acknowledgement response of one or more MPDUs as MAC layer group acknowledgement response Group ACK, and sends the instant Group ACK in the allocated uplink short signaling channel so as to acknowledge.

Uplink general instant ACK strategy includes steps as following.

Step S804: after the scheduling of uplink of the Nth frame is completed, the CAP determines the transmission user of uplink transmission channel UL-TCH of the Nth frame is STA3, then ensures to allocate corresponding downlink resources in the (N+1)th frame, for the user STA3 scheduled in uplink of the Nth frame, which is for used for sending instant ACK. For instance, in FIG. 8, scheduled uplink STA3 in the Nth frame, then allocates DL short signaling resource for STA3 in the (N+1)th frame, which is used for instant ACK.

Step S805: the CAP generates corresponding CCH signaling for previously mentioned ACK, and sends in the CCH control channel of the (N+1)th frame.

Step S806: after STA3 demodulates on CCH in the Nth frame, it obtained corresponding uplink TCH resource, and sends service data in UL-TCH.

Step S807: after CAP receives the one or more MAC groups MPDUs in UL-TCH of STA3, it generates the acknowledgement response of one or more MPDU, and encapsulates the acknowledgement response of one or more MPDUs as MAC layer group acknowledgement response Group ACK, and sends the Group ACK in downlink short signaling channel of the (N+1)th frame.

Embodiment Ten

In order to achieve the above method, The embodiment of the present disclosure proposes an apparatus for frame acknowledgment, as shown in FIG. 9. The apparatus includes the following components.

Allocation module 11, being used for allocating feedback resources in current physical frame after the scheduling of downlink service data and resource allocation is completed; or being used for allocating feedback resources in downlink of next frame after the scheduling of uplink service data and resource allocation is completed, which is used for sending group acknowledgement response Group ACK.

Encapsulation Module 12, being used for encapsulating corresponding feedback resources control signaling according to the allocated feedback resources. This feedback resources control signaling is used for indicating allocation of feedback resources.

Sending module 13 that is used for sending this feedback resources control signaling in control channel of physical frame.

Optionally, the feedback resource may be a transmission channel resource, or, a short signaling channel resource.

Further, downlink ACK strategy, aforementioned apparatus has the following characteristics.

Allocation module 11, being concretely used for CAP allocate corresponding uplink transmission channel resources or uplink short signaling channel resources in uplink of the Nth frame for the user scheduled in downlink of the Nth frame after the scheduling of downlink service data and resource allocation of the Nth frame is completed, used for sending MAC layer group acknowledgement response Group ACK;

Encapsulation Module 12, being concretely used for encapsulating corresponding feedback resources control signaling according to the allocated uplink transmission channel resources or uplink short signaling channel resources;

Sending module 13, being concretely used for sending this feedback resources control signaling in control channel of the Nth frame.

Further, uplink ACK strategy of the aforementioned apparatus also has the following characteristics.

Allocation module 11, being also used for CAP allocate corresponding downlink feedback resources or downlink short signaling in downlink of the (N+1)th frame for the user scheduled in uplink of the Nth frame after the scheduling of downlink service data and resource allocation of the Nth frame is completed, used for sending group acknowledgement response Group ACK;

Encapsulation Module 12, being also used for encapsulating corresponding feedback resources control signaling according to the allocated downlink transmission channel resources or downlink short signaling channel resources;

Sending module 13, being concretely used for sending this feedback resources control signaling in control channel of the (N+1)th frame.

Figure 10:
FIG. 10 is a diagram of another apparatus for frame acknowledgment provided in the 10th embodiment of this present disclosure.

As shown in FIG. 10, further, above-mentioned apparatus also comprise:

Generation module 14, being used for generating acknowledgement response of one or more MPDUs after receiving group in corresponding uplink transmission resource, and encapsulating said acknowledgement response of one or more MPDUs as MAC layer group acknowledgement response Group ACK.

Second sending Module 15, being used for sending this Group ACK in downlink transmission channel or downlink short signaling channel of the (N+1)th frame.

Further, the aforementioned apparatus also has following characteristics.

Control channel can be used for indicating feedback resource allocation of the corresponding downlink transmission channel or downlink short signaling channel of this frame to user scheduled in uplink of previous frame, or be used for the CAP to send group acknowledgement response Group ACK. Control channel can also be used for indicating feedback resource allocation of uplink transmission channel or uplink short signaling channel to user scheduled in downlink of this frame, used for STA to send Group ACK.

Embodiment Eleven

Figure 11:
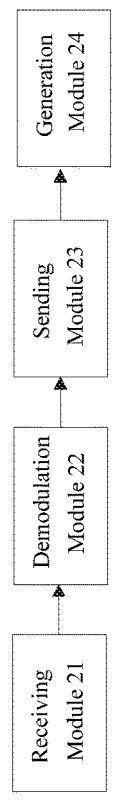
FIG. 11 is a diagram of another apparatus for frame acknowledgment provided in the 11th embodiment of this present disclosure.

In order to achieve the above method, the embodiment of the present disclosure proposes a kind of apparatus (terminal device STA) for frame acknowledgment, as shown in FIG. 11. The method includes the following steps.

Receiving Module 21, used for receiving downlink physical frame;

Demodulation Module 22, used for carrying out demodulation on Control channel of physical frame, obtains corresponding downlink transmission resource indication signaling information and feedback resource control signaling information.

Optionally, this feedback resource may be an uplink transmission channel resource, or, an uplink short signaling channel resource.

Above-mentioned apparatus also includes the following components.

Generation module 23, being used for generating acknowledgement response of one or more MPDUs after receiving one or more groups in corresponding downlink transmission resource, and encapsulating acknowledgement response of the said one or more MPDUs as MAC layer group acknowledgement response Group ACK.

Sending Module 24, being used for sending this Group ACK in uplink transmission channel or uplink short signaling channel of current frame.

Embodiment Twelve

Figure 12:
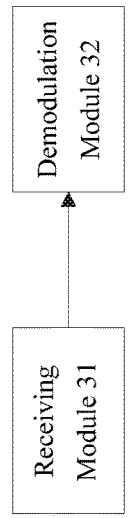
FIG. 12 is a diagram of another apparatus for frame acknowledgment provided in the 12th embodiment of this present disclosure.

In order to achieve the above method, the embodiment of the present disclosure proposes an apparatus (e.g., terminal device STA) for frame acknowledgment, as shown in FIG. 12. The apparatus includes the following components.

Receiving Module 31, used for receiving downlink physical frame.

Demodulation Module 32, used for carrying out demodulation on Control channel of physical frame, obtains corresponding uplink transmission resource indication signaling information, also used for carrying out demodulation on Control channel of next frame, obtains corresponding feedback resource control signaling information.

Optionally, this feedback resource may be a downlink transmission channel resource, or, a downlink short signaling channel resource.

The method and device adopted in embodiments of this present disclosure carry out transmission and acknowledgement of data packet with form of MAC frame at MAC layer. This packet acknowledgement strategy is simple to implement and support systems with minimum acknowledgement time delay and very high reliability. In embodiments of the present disclosure, short signaling channel is in the front; time delay is little; and reaction is fast; which are conducive to resource scheduling and retransmitting scheduling. Further, in embodiments of the present disclosure group aggregation frame G-MPDU seldom comprise fragment, which reduces use of fragment.

Unless otherwise specific statement, terms such as process, calculate, compute, determine, display, etc., can refer to one or more processing or computing system or similar devices action and/or process. Said action and/or process will be represented as data operation of physics (such as electronics) quantity in the memory or register of processing system, and be converted into other data which similarly by representing as physical quantity in memory, register or other this type information store device, transmitting or display equipment. Information and signal can use any one in multiple different techniques and methods to represent. Such as, data, instruction, order, information, signal, bit, symbol and chip mentioned in above description can represent by voltage, electric current, electromagnetic wave, magnetic field or particle, light field or particle or its any combination.

It should be known that the particular order of step in disclosed process or level are the examples of illustrative methods. Based on design preference, it should be understood that the particular order of the step in process or level can be rearranged when not departing from scope of protection in this disclosure. Appended method claim gives element of various steps with exemplary order, and is not to be limited to describe particular order or level.

In above-mentioned detailed description, various features are combined together in single embodiment, to simplify this disclosure. Should not be interpreted as reflecting such intention by this kind of open method, that is, the embodiment of claimed theme needs the more feature of feature clearly stated in each claim. On the contrary, as reflected in appended claims, the present disclosure is in the state fewer than whole features of disclosed single embodiment. Therefore, appending claims is clearly incorporated in describing in detail hereby, and wherein each claim is alone as the preferred embodiment that present disclosure is independent.

Those skilled in the art should understand, the logic frame, module, circuit and algorithm steps for various explanations described in embodiment Combined with this article herein, all can be implemented as electronic hardware, computer software or its combination. In order to illustrate clearly exchangeability between hardware and software, the above various parts, frame, module, circuit and steps for explanation are all carried out general description around its function. As to this kind of function implemented as hardware or software, that depends on specific application and the design constraint condition whole system applied. For each application-specific, Those skilled in the art can implement described function through a flexible way, but, this kind of implementation decision should not be construed as deviate from scope of protection in the present disclosure.

The method and algorithm steps for various explanations described in embodiment combined with this article herein, all can be directly reflected in hardware, software module performed by processor or their combination. Software module can be arranged in RAM memory, flash memory, ROM memory, EPROM memory, EEPROM memory, register, hard disk, mobile disk, CD-ROM or other form any storage medium well known in the art. An exemplary storage medium is connected to a processor device, thus enables processor device can read information from it, and write information to this storage medium. Certainly, storage medium can also be as a part of processor device. Processor device and storage medium can be arranged in ASIC. This ASIC can be arranged in user terminal. Certainly, processor device and store medium can also be present in user terminal as discrete assembly.

for software implementations, the technology described in the application can be implemented by the module (process, function etc.) performing said function described in the application. These software codes can be stored in memory unit and perform by processor. Memory unit can be implemented in processor device. It is also possible to be implemented outside processor device. In the case of the latter, it is coupled to processor device by communication via various means, which are known in the art.

Above description comprises the citing of one or more embodiment. Certainly, describing all possible combination of parts or method in order to describe foresaid embodiment is impossible, but ordinary skill in the art should recognize that that each embodiment can do further combinations and permutations. Therefore, embodiment described herein is intended to cover all such changes, modifications and variations, which come within scope of protection requested by appended claims. In addition, with regard term "comprising" used in specification or claims, the cover mode of this word is similar to term "including," just as "including," such as explanation of conjunction used in claim. In addition, using any one term in specification or claims "or" is to be represented "non-exclusive or."

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for frame acknowledgment, comprising:
allocating feedback resources in current physical frame after scheduling of downlink service data and resource allocation being completed, wherein the allocating is for sending a group acknowledgement response Group ACK from a terminal (STA) to a central access point (CAP); or, allocating feedback resources in downlink of next frame after the scheduling of uplink service data and resource allocation completed, wherein the allocating is for sending a group acknowledgement response Group ACK from a CAP to a STA;
encapsulating corresponding feedback resources control signaling according to the allocated feedback resources, wherein the feedback resources control signaling is used for indicating allocation of feedback resources; and
sending the feedback resources control signaling in control channel of the physical frame,
wherein said feedback resource is a transmission channel resource or a short signaling channel resource; and the method further comprises:
allocating corresponding downlink transmission channel resources or downlink short signaling channel resources in downlink of the (N+1)th frame for the user scheduled in uplink of the Nth frame after the scheduling of uplink service data and resource allocation of the Nth frame completed, wherein the allocating is used for sending MAC layer group acknowledgement response Group ACK;
encapsulating corresponding feedback resources control signaling according to the allocated downlink transmission channel resources or downlink short signaling channel resources; and
sending this feedback resources control signaling in control channel of the (N+1)th frame.

2. The method of claim 1, further comprising:
allocating corresponding uplink transmission channel resources or uplink short signaling channel resources in uplink of an Nth frame for a user scheduled in downlink of the Nth frame after the scheduling of downlink service data and resource allocation of the Nth frame being completed, wherein the allocating is for sending a MAC layer group acknowledgement response Group ACK;
encapsulating corresponding feedback resources control signaling according to the allocated uplink transmission channel resources or uplink short signaling channel resources; and
sending this feedback resources control signaling in control channel of the Nth frame.

3. The method of claim 2, wherein:
a user scheduled in downlink demodulates on control channel in the Nth frame, obtains corresponding downlink transmission resource indication signaling information and feedback resource control signaling information; said feedback resource being an uplink transmission channel resource or an uplink short signaling channel resource.

4. The method of claim 2, further comprising:
after the user receives the one or more MAC groups MPDU in corresponding downlink transmission resource, generating acknowledgement response of one or more MPDUs, and
encapsulating the acknowledgement response of one or more MPDUs as MAC layer group acknowledgement response Group ACKs, and send to a CAP in the uplink transmission channel or uplink short signaling channel of the Nth frame.

5. The method of claim 1, wherein:
the user scheduled in uplink carry out demodulation on control channel in the Nth frame, obtains corresponding uplink transmission resource indication signaling information, carries out demodulation on control channel in the (N+1)th frame, and obtains corresponding feedback resource control signaling information; said feedback resource being a downlink transmission channel resource or a downlink short signaling channel resource.

6. The method of claim 5, wherein:
after receiving the one or more MAC groups MPDU in corresponding downlink transmission resource, the CAP generates acknowledgement response of one or more MPDUs, and encapsulates the acknowledgement response of one or more MPDUs as MAC layer group acknowledgement response Group ACK, and sends in downlink transmission channel or downlink short signaling channel of the (N+1)th frame.

7. The method of claim 1, wherein:
said control channel is used for indicating a first feedback resource allocation of the corresponding downlink transmission channel or downlink short signaling channel of this frame to a user scheduled in uplink of previous frame, information of the first feedback resource allocation being used for a CAP to send group acknowledgement response Group ACK; and,
said control channel is used for indicating a second feedback resource allocation of the link transmission channel or uplink short signaling channel to a user scheduled in downlink of this frame, information of the second feedback resource allocation being used for STA to send a Group ACK.

8. An apparatus for frame acknowledgment, comprising:
a memory; and
a processor coupled to the memory, the processor being configured to:
allocate feedback resources in current physical frame after the scheduling of downlink service data and resource allocation completed; or, allocate feedback resources in downlink of next frame after the scheduling of uplink service data and resource allocation completed, the allocating being used for sending group acknowledgement response Group ACK, wherein the group acknowledgment response Group ACK is sent from a terminal (STA) to a central access point (CAP) in uplink transmission, and is sent from a CAP to a STA in downlink transmission;

encapsulate corresponding feedback resources control signaling according to the allocated feedback resources, said feedback resources control signaling is used for indicating allocation of feedback resources; and send said feedback resources control signaling in control channel of a physical frame, wherein the processor is further configured for:

CAP allocating corresponding downlink feedback resources or downlink short signaling in downlink of the (N+1)th frame for the user scheduled in uplink of the Nth frame after the scheduling of downlink service data and resource allocation of the Nth frame completed, used for sending group acknowledgement response Group ACK;

encapsulating corresponding feedback resources control signaling according to the allocated downlink transmission channel resources or downlink short signaling channel resources; and sending this feedback resources control signaling in control channel of the (N+1)th frame.

9. The apparatus of claim 8, wherein said feedback resource is a transmission channel resource or a short signaling channel resource.

10. The apparatus of claim 8, wherein the processor is further configured for:

CAP allocating corresponding uplink transmission channel resources or uplink short signaling channel resources in uplink of the Nth frame for the user scheduled in downlink of the Nth frame after the scheduling of downlink service data and resource allocation of the Nth frame completed, used for sending MAC layer group acknowledgement response Group ACK;

encapsulating corresponding feedback resources control signaling according to the allocated uplink transmission channel resources or uplink short signaling channel resources; and sending this feedback resources control signaling in control channel of the Nth frame.

11. The apparatus of claim 8, wherein the processor is further configured to:

generate acknowledgement response of one or more MPDU after receiving group in corresponding uplink transmission resource, and encapsulating said acknowledgement response of one or more MPDU as MAC layer group acknowledgement response Group ACK;

send this Group ACK in the downlink transmission channel or the downlink short signaling channel of the (N+1)th frame.

12. The apparatus of claim 8, wherein: said control channel is configured for:

indicating a first feedback resource allocation of the corresponding downlink transmission channel or downlink short signaling channel of this frame to user scheduled in uplink of previous frame, information of the first feedback resource allocation being used for CAP to send group acknowledgement response Group ACK; and indicating a second feedback resource allocation of uplink transmission channel or uplink short signaling channel to user scheduled in downlink of this frame, information of the second feedback resource allocation being used for STA to send Group ACK.

* * * * *